United States Patent
Jiang et al.

(10) Patent No.: US 6,603,507 B1
(45) Date of Patent: Aug. 5, 2003

(54) METHOD FOR CONTROLLING A LIGHT SOURCE IN A NIGHT VISION SURVEILLANCE SYSTEM

(75) Inventors: Shiaw-Shiang Jiang, Hsinchu (TW); Chunn-Yenn Lin, Taoyuan Hsien (TW); Guang-Hann Liou, Taipei Hsien (TW)

(73) Assignee: Chung-Shan Institute of Science and Technology, Taoyuan (TW)

( * ) Notice: Subject to any disclaimer, the term of this patent is extended or adjusted under 35 U.S.C. 154(b) by 0 days.

(21) Appl. No.: 09/328,982

(22) Filed: Jun. 9, 1999

(51) Int. Cl.$^7$ .................. H04N 5/225; H04N 5/222; G02B 26/00
(52) U.S. Cl. ............... 348/216; 348/370; 348/371; 359/237
(58) Field of Search .................. 348/216.1, 370, 348/371

(56) References Cited

U.S. PATENT DOCUMENTS 4,635,123 A * 1/1987 Masunaga ............ 358/213
5,010,412 A * 4/1991 Garriss ................ 358/240

* cited by examiner

Primary Examiner—Wendy R. Garber
Assistant Examiner—Catherine Toppin
(74) Attorney, Agent, or Firm—J.C. Patents

(57) ABSTRACT

A method for controlling a light source in a night vision system is provided. The method first computes a pulse width $T_p=2(d-d_1)/c$, where c is the light speed, according to parameters of a desired observing distance d and a shortest distance $d_1$ of the back-scattering light that enters the light sensor, such as a low-light-level camera. According to the definition of duty cycle D, it is determined by $D=(1-d_1/d)/(2-d_1/d)$. According to the parameters of the desired observing distance and the pulse width, control signals are generated by a pulse signal controller to control a pulsed active-light illuminator with proper emitting period and a gated light sensor with proper gated-on period.

10 Claims, 4 Drawing Sheets

METHOD FOR CONTROLLING A LIGHT SOURCE IN A NIGHT VISION SURVEILLANCE SYSTEM

BACKGROUND OF THE INVENTION

1. Field of the Invention

This invention relates to a night vision surveillance system, and more particularly to a method for controlling a light source in a night vision surveillance system with low light noise.

2. Description of Related Art

A low-light-level (LLL) camera, or called as a light intensified camera intensifies its collected light under low light level condition. Under a dim environment with, for example, moon light or star light, the low-light-level camera can collect and intensify the dim light reflected from an object to form a visible image. The LLL camera therefore achieves the purpose to observe objects during the night. Basically, the LLL camera achieves its purpose by intensifying the collected dim light signal. If the environment is fully dark or light intensity is too low, the LLL camera may lose its function to observe objects. In order to solve this problem of insufficient light intensity, a long range night vision surveillance system with high performance usually includes an active illuminating device, such as a laser light source, to actively provide the necessary light intensity for the LLL camera. The LLL camera therefore is not limited by the dark environment. Generally, the illuminator used in night vision system includes a continuous waveform (CW) active-light illuminator or a pulse waveform (PW) active-light illuminator. The illuminator includes, for example, a laser light source.

FIG. 1 is a drawing, schematically illustrating a conventional CW active-light illuminator used with a low-light-level camera. In FIG. 1, an active illuminator 100, such as a laser light source, emits a light to illuminate an object 120, which reflects the light to a low-light-level camera 110. The active illuminator 100 usually is located at a place near to the low-light-level camera 110 by about less than 30 cm, in which two optical axes of them remain in parallel. The active illuminator 100 emits light with continuous waves. An output power of the active illuminator is $P_o$, the low-light-level camera 110 has a receiving power $P_{rec}$, and the object 120, or called a target, reflects the incident active light with a power $P_{Target}$ arriving the camera. The active light emitted from the active illuminator 100 may be scattered by particles in the atmosphere. All lights scattered by the atmosphere into the lens of the low-light-level camera 110 produce a scattering power PBS. The receiving power $P_{rec}$ naturally has a relation:

$$P_{rec} = P_{Target} + P_{BS},$$

in which the $P_{Target}$ is the surveillanced signal and the $P_{BS}$ is the light noise. Since the CW active-light illuminator is affected by the light noise from back-scattering, it is limited to apply in the long-range night vision system.

FIG. 2 A is a drawing, schematically illustrating a conventional PW active-light illuminator used with a low-light-level camera. In FIG. 2A, a low-light-level camera 210 is usually gated off. An active illuminator 200, such as a laser source, emits a light pulse with a very short pulse width. As the light pulse is reflected by an object 200 onto the low-light-level camera 210, the low-light-level camera 210 is gated on for a short time to receive the light pulse. After that, the low-light-level camera 210 is gated off again until the second pulse is emitted and reflected back from the target. In this manner, the light noise can be reduced.

FIG. 2B is a timing sequence of operation of the PW illuminator in FIG. 2A. In FIG. 2A and FIG. 2B, the light pulses are periodically emitted as denoted by "ON". The "OFF" status of the light means that there is no light pulse emitted. The light pulse has a very short width $T_p$ with a shape like the third pulse in FIG. 2B, in which $T_p$ is also the time period for gating on the low-light-level camera 210. A distance "d" in FIG. 2A represents the distance between the light source 200 and the object 220. Light travels in the light speed c as usual as a physics phenomenon. In this setup, the low-light-level camera 210 is gated off for a period of $T_{2d} = 2d/c$ and then gated on with a period of time $T_p$, which is denoted as "ON" at the lower timing sequence. There is an idle period of $T_i$ before the next light pulse being emitted. $T_i$ can be set to zero if possible for the active illuminator 200.

In the manner shown in FIGS. 2A and 2B, the back-scattering lights as shown in curved arrows basically arrive at the low-light-level camera 210 before the light pulse reflected by the object 220 arrives because of the traveling distance. Thus, the back-scattering lights are not "visible" by the low-light-level camera 210, which is still gated off when the back-scattering lights arrive. Thereby, the light noise is reduced. However, since the light pulse has very short width, each light pulse can only provide a very limited power. In other word, the light system, such as a laser light source, usually has a low duty cycle, which is a ratio of the emitting pulse width to the period of the light pulses. In FIG. 2B, the duty cycle is equal to $T_p/(T_{2d}+T_i+T_p)$. Furthermore, if the observing distance d is very long, the duty cycle basically is inversely proportional to the observing distance d. In order to achieve the illuminating purpose, a peak power of the light source 200 of FIG. 2A needs to be very large. This limits the observing range of the low-light-level camera.

In summary of the conventional active-light illuminators, some drawbacks are as the following:

1. For the conventional CW active-light illuminator, the light is continuously emitted. This causes that the low-light-level camera is continuously opened to receive the reflected light from the object. The light noise from the back-scattering light is inevitably received by the camera, causing a deterioration of the performance. In a practical experience, it can only observe the objects within one kilometer or so under a clear night sky.
2. For the conventional PW active-light illuminator, even though the light noise resulting from the back-scattering light can be avoided by proper ON-OFF timing controls, its duty cycle is strongly reduced, causing a need of a light source with very high peak power. Otherwise, the observing range is also limited.

The observing range of the low-light-level camera with above illuminators is limited due to either the light noise or an insufficient peak power of the light source.

SUMMARY OF THE INVENTION

It is at least an objective of the present invention to provide a method for controlling a light source in a night vision surveillance system with low light noise. A larger width of the active light pulse is allowed so that the duty cycle is increased and the ON-OFF timing is also properly controlled so that the observable range of the night vision system is improved without conventional issues.

It is at least another objective of the present invention to provide a method for controlling a light source in a night vision system with low light noise. The light noise from the back-scattering light is effectively filtered away so that a higher contrast of observed objects is achieved.

In accordance with the foregoing and other objectives of the present invention, a method for controlling a light source in a night vision system is provided. The method includes computing a pulse width $T_p$ according to parameters of a desired observing distance d and a shortest distance $d_1$ of the back-scattering light that enters the light sensors of a night vision system, such as a low-light-level camera. Accordingly, the duty cycle is obtained. The pulse width $T_p=2(d-d_1)/c$, where c is the light speed. According to the parameters of the desired observing distance and the pulse width, an illuminating control signal and a camera control signal are generated by a pulse signal controller and respectively control a pulsed active-light illuminator and a low-light-level camera with proper timing.

In this manner, the shortest scattering-back distance $d_1$ is set to be about 0.01 to 0.99 of the observing distance d for a range of about 5 kilometers to get a good observed result according to practical experiences. A little adjustment can be performed to achieve an optimized condition. The back-scattering lights are effectively filtered away so that the contrast of the observed object is increased. A peak power of the pulsed active-light illuminator does not require a high power one. The illuminating performance is also improved.

BRIEF DESCRIPTION OF DRAWINGS

The invention can be more fully understood by reading the following detailed description of the preferred embodiment, with reference made to the accompanying drawings as follows.

DETAILED DESCRIPTION OF PREFERRED EMBODIMENT

Figure 3A:
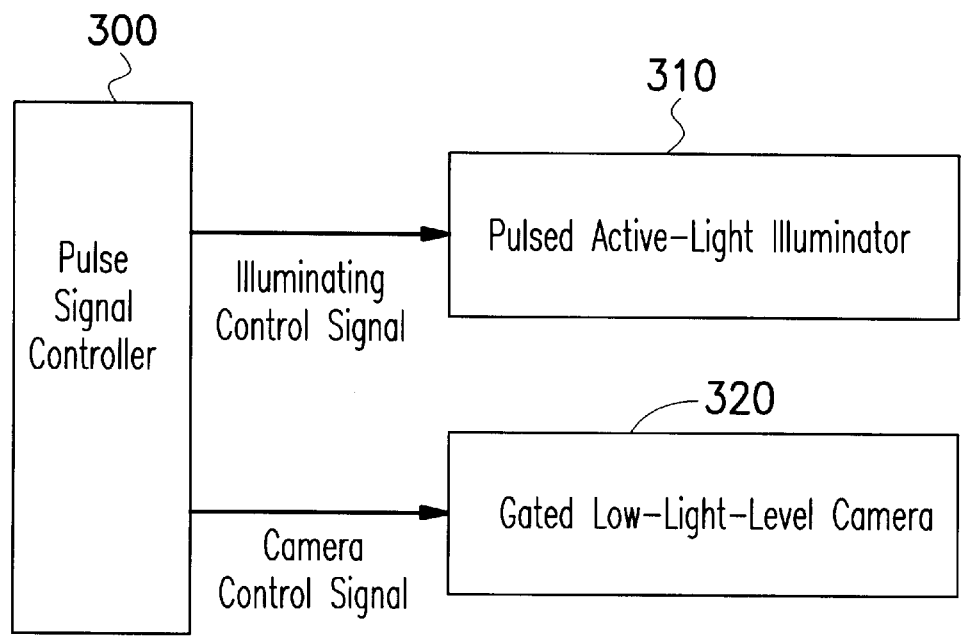
FIG. 3A is a block diagram, schematically illustrating a night vision system with a pulsed active-light illuminator, according to a preferred embodiment of the invention.

FIG. 3A is a block diagram, schematically illustrating a night vision system with a pulsed active-light illuminator, according to a preferred embodiment of the invention.

Figure 1:
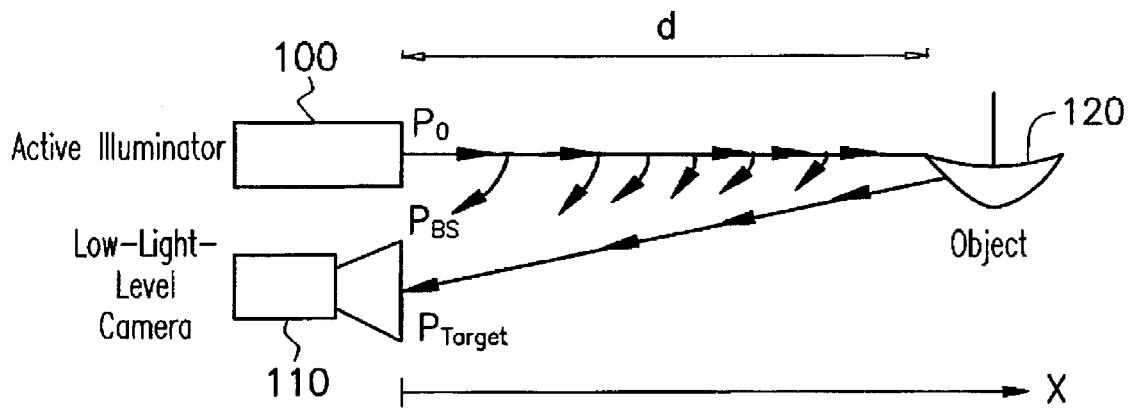
FIG. 1 is a drawing, schematically illustrating a conventional CW active-light illuminator used with a low-light-level camera.
Figure 2A:
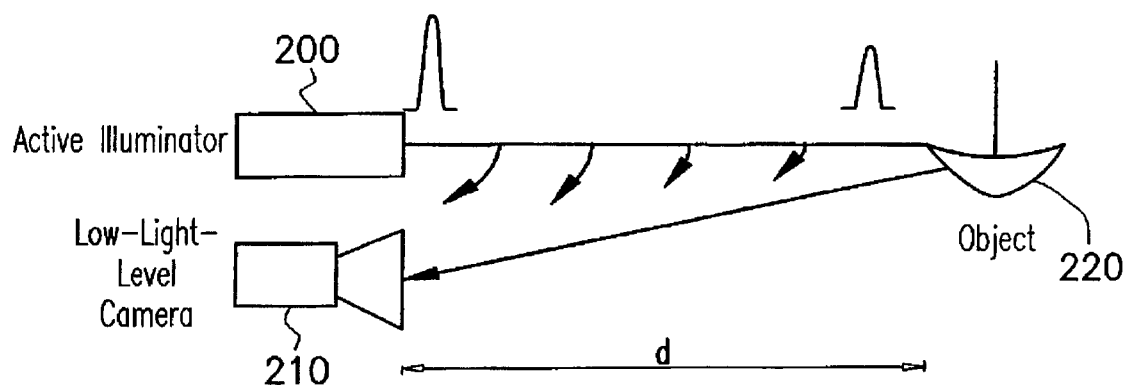
FIG. 2A is a drawing, schematically illustrating a conventional PW active-light illuminator used with a low-light-level camera.

In FIG. 3A, a night vision system includes at least a pulse signal controller 300, a pulsed active-light illuminator 310, and a gated low-light-level camera 320. The pulse signal controller 300 can produce an illuminating control signal to control the pulsed active-light illuminator 310 so as to periodically emit light pulses with a given frequency and a duty cycle D. The pulse signal controller 300 can also produce a camera control signal to control the gated low-light-level camera 320 so as to properly gate it on for receiving the light pulses reflected by an object, which is like the one shown in FIG. 2A.

A consideration about how to improve the performance of the night vision system is following. As a physical phenomenon, a light intensity of the light pulse usually decays when the pulse is reflected by the object and received by the gated low-light-level camera 320. Typically, its decay rate is proportional to $1/d^4$, in which d is a desired observing distance. It is similar for the back-scattering light, which is also inversely proportional to a distance to the fourth power. As a result, only those scattering lights from a short distance near the gated low-light-level camera 320 can affect the observing performance. This consideration allows a wider pulse width. If the peak power of the illuminator remains constant, the averaged illuminating power depends on the duty cycle D, which is a ratio of the emitting pulse width to the period of the light pulses. But, if the pulse width is too large, the back scattering lights from the atmosphere near the gated low-light-level camera 320 may enter the system and form the light noise. A good observing performance needs a proper pulse width so as to achieve a high averaged illuminating power without including too much light noise.

Figure 2B:
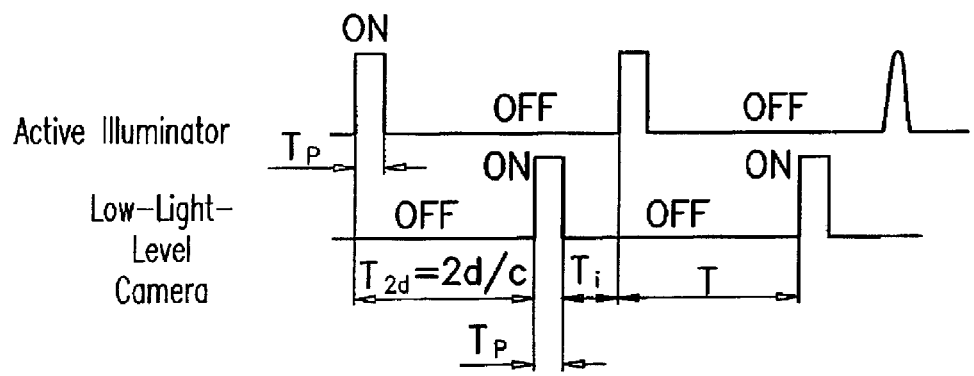
FIG. 2B is a timing sequence of operation of the PW illuminator in FIG. 2A.
Figure 3B:
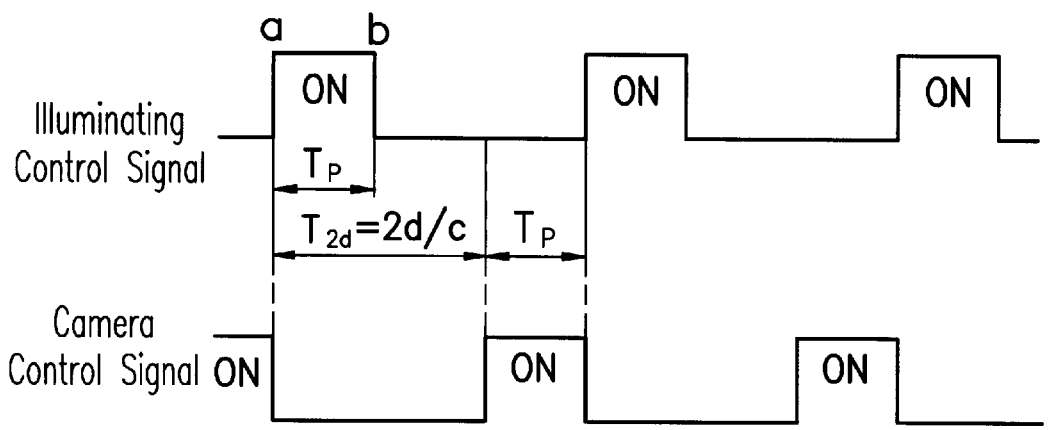
FIG. 3B is a timing sequence, schematically illustrating a timing relation between an illuminating control signal and an camera control signal.

FIG. 3B is a timing sequence, schematically illustrating a timing relation between an illuminating control signal and a camera control signal. In FIG. 3B, an ON status represents an open status, and the OFF status with a low logic level represents a close status for both control signals from FIG. 3A. A proper pulse width $T_p$ is determined by a method, which is to be described later in detail. In this timing sequence of the invention, there is no idle time shown. This means that the idle time $T_i$ in FIG. 2B is zero in FIG. 3B. Of course, the idle time can be nonzero if necessary. The camera control signal is identical to the illuminator control signal but has a delay of $T_{2d}$. If the desired observing distance is d, the gated low-light-level camera 320 of FIG. 3A is gated on with a delay time of $T_{2d}=2d/c$ after the illuminator is turned on. The next light pulse is emitted by the pulsed active-light illuminator 310, at $t=T_p+T_{2d}$. The duty cycle D is defined as a ratio of $T_p/(T_p+T_{2d})$. The most essential parameter in this manner is the $T_p$, which is a quantity between point a and point b in FIG. 3B and can be determined by following discussions.

Figure 4A:
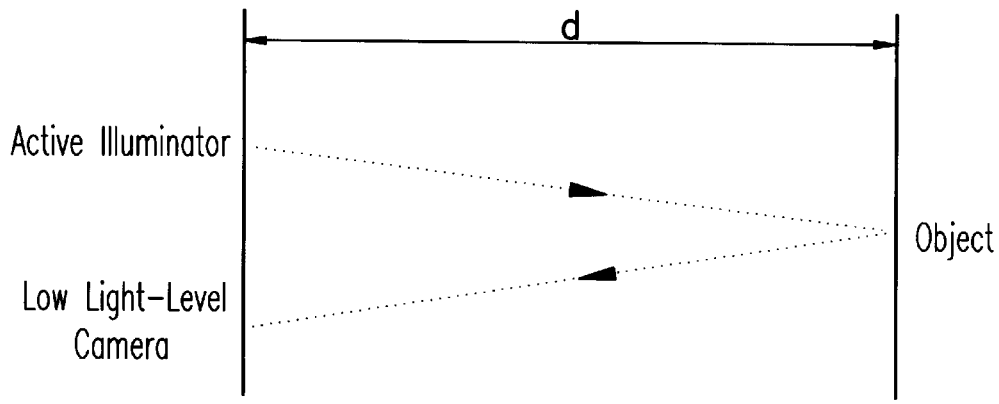
FIGS. 4A–4F are drawings, schematically illustrating a light path of the emitted light pulse varying with time.
Figure 4B:
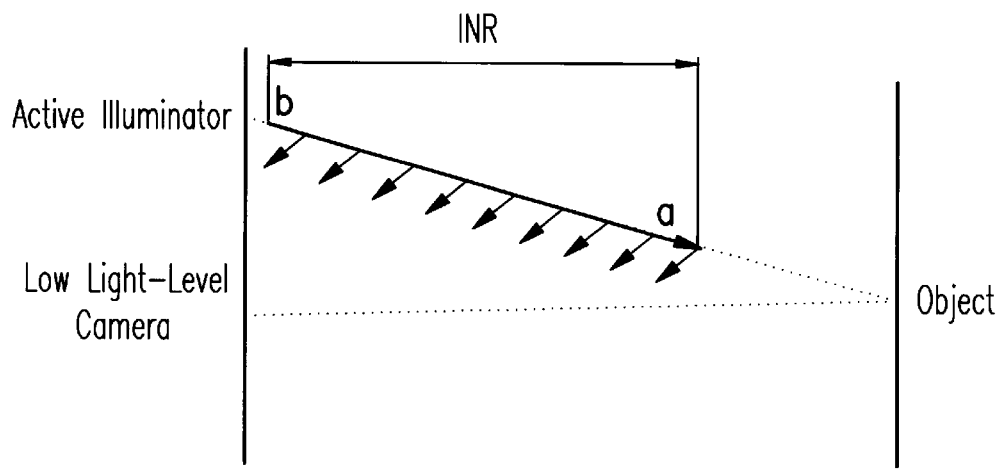

FIGS. 4A–4F are drawings, schematically illustrating a light path of the emitted light pulse varying with time. In these drawings, the left vertical line represents the locations of the light source and the low-light-level camera, and the right vertical line represents the location of the object. The left and right vertical lines are separated by the observing distance d. In FIG. 4A, there are no light pulses emitted yet. The dotted line is an expected light path. In FIG. 4B, when $T_p<t<T_{2d}/2$, a light pulse has been emitted and forms a light beam within the point a and the point b, which correspond to the points a and b in FIG. 3B respectively. The point a is the leading point and the point b is the ending point. The light beam is scattered by particles in the atmosphere, resulting several back-scattering lights as shown in small arrows. Since the low-light-level camera will be gated off when these back-scattering lights arrive at the camera, they are "invisible" to the camera and make no effect to it. It is called an ineffective noise region (INR).

Figure 4C:
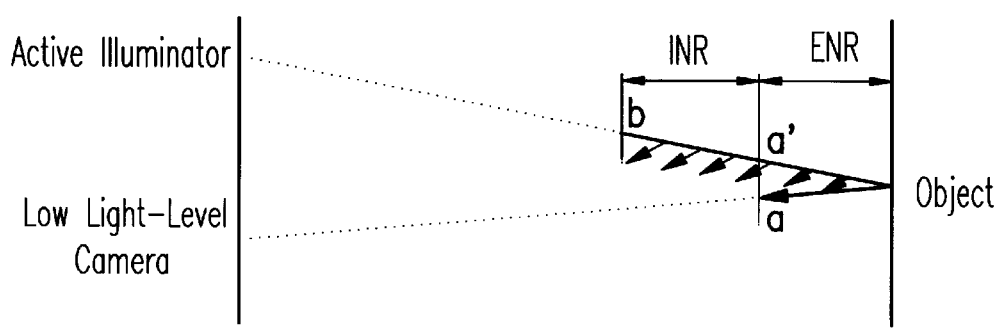

In FIG. 4C, as the light beam continuously travels at a time within $T_{2d}<t<(T_{2d}+T_p)/2$, the point a has been reflected by the object and are traveling back. At this stage, the INR region is between the point b and the point a' because it is behind the point a and the back-scattering lights of this region will arrive at the camera before it is gated on. An effective noise region (ENR) between the point a' and the Object now appears. All the back-scattering lights within the ENR will be sensed by the low-light-level camera because they will arrive at the camera when it is gated on.

Figure 4D:
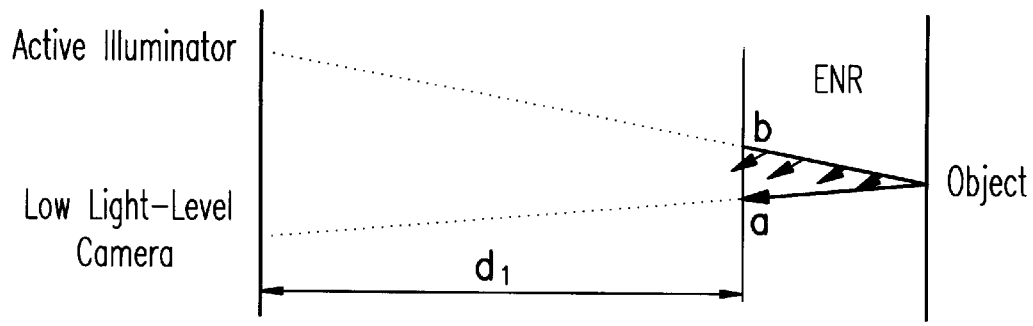

In FIG. 4D, as time goes at $t=(T_{2d}+T_p)/2$, the range of the ENR reaches its maximum. At this stage, a parameter of a shortest back-scattering distance di is obtained. There is no INR.

Figure 4E:
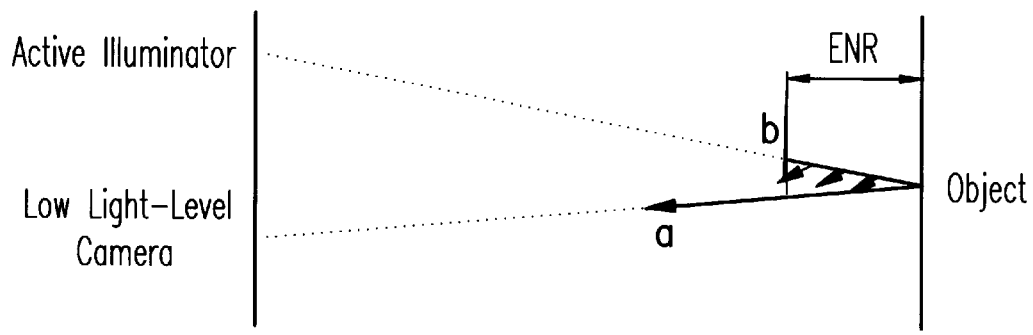
Figure 4F:
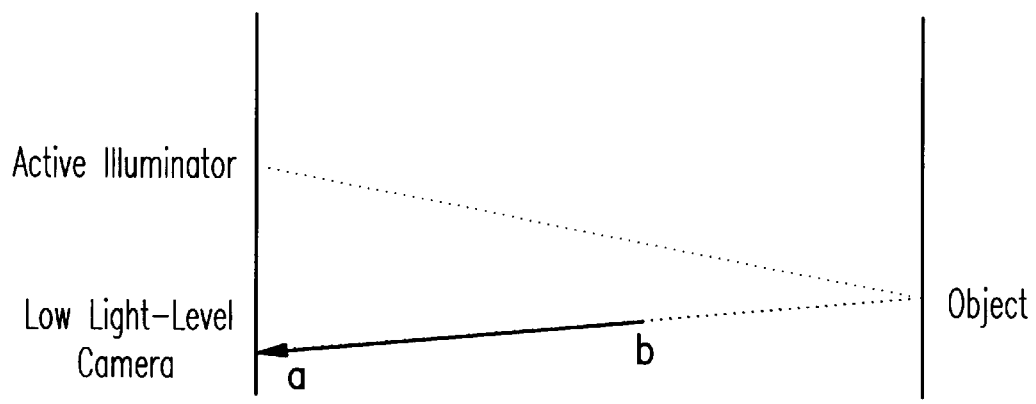

In FIG. 4E, as the light beam keeps on traveling, there is no INR any more at a time, $(T_{2d}+T_p)/2<t<T_{2d}/2+T_p$. In FIG. 4F, the point a reaches the low-light-level camera, which begins to be gated on at this moment. The gate-on status will last for a period of $T_p$ until the point b arrives at the camera.

The parameter $d_1$ is a key parameter to determine the $T_p$. The parameter $d_1$ is $$d_1 = d - (T_p/2) \cdot c,$$

where c is the light speed. Since $T_{2d}=2d/c$, $c=2d/T_{2d}$. Substituting the c, $$d_1 = \left(1 - \frac{T_p}{T_{2d}}\right) \cdot d, \quad (1)$$

$$\frac{d_1}{d} = 1 - \frac{T_p}{T_{2d}}. \quad (2)$$

Therefore, the duty cycle D is:

$$D = \frac{T_p}{T_p + T_{2d}} = \frac{1 - \frac{d_1}{d}}{2 - \frac{d_1}{d}}. \quad (3)$$

For an actual application, in Eq. 3, the duty cycle D can be estimated by the parameters of d and $d_1$. The parameter d can be precisely measured with a laser range finder or estimated by a desirable value. The parameter $d_1$ can be estimated or set to be about 0.01d to 0.99d to get good observing results according to practical experiences. According to Eq. 3, the duty cycle D is obtained. The parameters $T_p$ and $T_{2d}$ are also accordingly obtained and are used by the pulse signal controller 300 of FIG. 3A to control the pulsed active-light illuminator 310 and the gated low-light-level camera 320. The timing sequence of FIG. 3B is thereby accordingly generated.

According to various practical uses, the night vision system of FIG. 3A can achieve an effective observing range of about 5–6 kilometers with a peak power of 1W–2W of the light source, such as a laser source. For a usual conventional night vision system with the same peak power, it is only about one kilometer.

In conclusion, the night vision system uses the pulse signal controller to properly control the pulse width and the ON-OFF timing so that the back-scattering light noise is effectively filtered away. As a result, the contrast of the observed image is increased and the observing range is greatly improved.

The invention has been described using an exemplary preferred embodiment. However, it is to be understood that the scope of the invention is not limited to the disclosed embodiment. On the contrary, it is intended to cover various modifications and similar arrangements. The scope of the claims, therefore, should be accorded the broadest interpretation so as to encompass all such modifications and similar arrangements.

What is claimed is:

1. A method for controlling a light source in a night vision system, which comprises a pulsed light illuminator and a gated light sensor, the method comprising:

estimating or measuring a desired observing distance d of an object;

setting a shortest distance $d_1$ for back-scattering lights to enter the light sensor;

determining a pulse width $T_p$ of a light beam emitted from the pulsed light illuminator, in which $T_p=2(d-d_1)/c$, where c represents a light speed;

determining a duty cycle D for the pulsed light illuminator, wherein D is equal to $T_p/(T_p+T_{2d})$, where $T_{2d}=2d/c$;

the pulsed active-light illuminator emitting light pulses with the pulse width $T_p$ and an emitting period $(T_p+T_{2d})$; and the light sensor receiving the light pulses which are reflected by the object, wherein the light sensor has a sensing period identical to the emitting period but with a delay time of $T_{2d}$.

2. The method of claim 1, wherein the $d_1$ is set to be in a range of about 0.01d to 0.99d.

3. The method of claim 1, wherein the duty cycle is set to $$D = \frac{T_p}{T_p + T_{2d}} = \frac{1 - \frac{d_1}{d}}{2 - \frac{d_1}{d}}.$$

4. A night vision system to observe an object at an observing distance d from the night vision system, the night vision system comprising:

a pulsed light source used to periodically emit light pulses, each of the light pulses comprises a light beam with respect to a pulse width $T_p$ for each of the light pulses;

a gated light sensor used to periodically receive the light pulses reflected by the object; and a pulse signal controller to produce an illuminating signal and a receiving control signal to respectively control the pulsed light source and the gated light sensor so as to periodically emitting and receiving the light beam, wherein each of the light pulses is controlled to have a duty cycle of $$D = \frac{T_P}{T_P + T_{2d}} = \frac{1 - \frac{d_1}{d}}{2 - \frac{d_1}{d}},$$

where $d_1 = d - (T_p/2)c$ and $T_{2d} = 2d/c$, so that the illuminating control signal controls the pulsed light source to emit the light pulses in an emitting period of $(T_p + T_{2d})$ and the receiving control signal controls the gated light sensor to receive the reflected light pulses in a receiving period which is identical to the emitting period but has a delay of $T_{2d}$.

5. The night vision system of claim 4, wherein the $d_1$ is the shortest distance of the light beam to the sensor, at which back-scattering lights can enter the gated sensor.

6. The night vision system of claim 4, wherein the $d_1$ is in a range of about 0.001d to 0.99d.

7. The night vision system of claim 4, wherein the gated light sensor comprises a gated low-light-level camera.

8. The night vision system of claim 4, wherein the pulsed light source comprises a pulsed laser illuminator.

9. The night vision system of claim 4, wherein the pulsed light source and the gated light sensor have parallel optical axes.

10. The night vision system of claim 9, wherein the pulsed light source and the gated light sensor are put sufficiently close so as to have a substantially equal distance to the object along the parallel optical axes.

* * * * *